US 6,861,481 B2

(12) United States Patent
Ding et al.

(10) Patent No.: US 6,861,481 B2
(45) Date of Patent: Mar. 1, 2005

(54) IONOMERIC NANOCOMPOSITES AND ARTICLES THEREFROM

(75) Inventors: Rui-dong Ding, Arlington, TX (US); Clint Newell, Arlington, TX (US)

(73) Assignee: Solvay Engineered Polymers, Inc., Grand Prairie, TX (US)

( * ) Notice: Subject to any disclaimer, the term of this patent is extended or adjusted under 35 U.S.C. 154(b) by 111 days.

(21) Appl. No.: 10/458,347

(22) Filed: Jun. 11, 2003

(65) Prior Publication Data

US 2003/0207984 A1 Nov. 6, 2003

Related U.S. Application Data

(63) Continuation-in-part of application No. 10/269,888, filed on Oct. 15, 2002, now Pat. No. 6,756,446, which is a continuation-in-part of application No. 10/074,950, filed on Feb. 12, 2002, now Pat. No. 6,509,416, which is a continuation-in-part of application No. 09/672,063, filed on Sep. 29, 2000, now Pat. No. 6,403,721.

(51) Int. Cl.[7] .............................. C08K 3/10; C08K 3/18; C08K 3/22; C08K 3/24; C08K 3/34
(52) U.S. Cl. ..................... 525/424; 524/430; 524/431; 524/432; 524/433; 524/436; 524/437; 524/438; 524/444; 524/492; 524/493; 524/495; 524/496; 524/847; 525/193; 525/194; 525/195; 977/DIG. 1
(58) Field of Search .................................. 524/424, 430, 524/431, 432, 433, 436, 437, 438, 444, 492, 493, 495, 496, 847; 525/193, 194, 195; 977/DIG. 1

(56) References Cited

U.S. PATENT DOCUMENTS

| | | | |
|---|---|---|---|
| 2,971,939 A | 2/1961 | Baer | 260/45.5 |
| 3,404,061 A | 10/1968 | Shane et al. | 161/125 |
| 4,184,988 A | 1/1980 | Makowski et al. | 260/23.5 |
| 4,795,482 A | 1/1989 | Gioffre et al. | 55/75 |
| 4,810,734 A | 3/1989 | Kawasumi et al. | 523/216 |
| 4,904,457 A | 2/1990 | Misra | 423/115 |
| 4,945,005 A | 7/1990 | Aleckner, Jr. et al. | 428/500 |
| 4,946,896 A | 8/1990 | Mitsuno et al. | 525/93 |
| 4,950,541 A | 8/1990 | Tabor et al. | 428/373 |
| 4,952,748 A | 8/1990 | Alexander et al. | 585/803 |
| 5,098,684 A | 3/1992 | Kresge et al. | 423/277 |
| 5,650,468 A | 7/1997 | Vandevijver et al. | 525/285 |
| 5,677,068 A * | 10/1997 | Ghirardo et al. | 428/500 |
| 5,883,188 A | 3/1999 | Hwang et al. | 525/71 |
| 5,910,523 A | 6/1999 | Hudson | 523/213 |
| 5,939,184 A | 8/1999 | Inoue et al. | 428/331 |
| 5,971,869 A | 10/1999 | Rajagopalan et al. | 473/371 |
| 5,972,520 A | 10/1999 | Howell | 428/516 |
| 6,207,761 B1 | 3/2001 | Smith et al. | 525/221 |
| 6,228,903 B1 | 5/2001 | Beall et al. | 523/209 |
| 6,403,721 B1 * | 6/2002 | Ding et al. | 525/191 |
| 6,447,860 B1 | 9/2002 | Mueller et al. | 428/36.6 |
| 6,451,897 B1 | 9/2002 | Niyogi | 524/445 |
| 6,462,122 B1 | 10/2002 | Qian et al. | 524/445 |
| 6,517,800 B1 | 2/2003 | Cheng et al. | 423/447.1 |

FOREIGN PATENT DOCUMENTS

| | | |
|---|---|---|
| WO | WO 00/66642 | 11/2000 |
| WO | WO 02/058139 | 7/2002 |

* cited by examiner

*Primary Examiner*—Nathan M. Nutter
(74) *Attorney, Agent, or Firm*—Winston & Strawn LLP

(57) ABSTRACT

An ionomeric nanocomposite that includes a base component of a propylene-based polyolefin-metal salt component and a nanostructured material. Optionally, the blend further contains a polymeric component including an ethylene ionomer, a styrenic block ionomer, a hydrogenated styrene-butadiene random copolymer, or a combination thereof. Such ionomeric nanocomposites have increased scratch and mar resistance while still retaining clarity and thermal stability. Methods of preparing such blends, as well as resultant articles including such blends, are also part of the invention.

20 Claims, No Drawings

IONOMERIC NANOCOMPOSITES AND ARTICLES THEREFROM

CROSS REFERENCE TO RELATED APPLICATIONS

This application is a continuation-in-part of application Ser. No. 10/269,888, filed Oct. 15, 2002, and now U.S. Pat. No. 6,756,446, which is a continuation-in-part of application Ser. No. 10/074,950, filed Feb. 12, 2002, now U.S. Pat. No. 6,509,416, which is a continuation-in-part of application Ser. No. 09/672,063, filed Sep. 29, 2000, now U.S. Pat. No. 6,403,721. The entire contents of each of the prior applications is incorporated herein by express reference thereto.

TECHNICAL FIELD

The invention relates to polyolefin resin blends that include a polypropylene-based polyolefin-metal salt component and have superior physical properties including enhanced scratch resistance, barrier properties, clarity, gloss, and thermal stability. The invention also relates to the process of manufacturing such polyolefin resin blends and to articles produced from such polyolefin resin blends.

BACKGROUND OF THE INVENTION

Nanocomposites are a relatively new class of composites that are particle-filled polymers for which at least one dimension of the dispersed particle is in the nanometer range ($10^{-9}$ meter). Because of the size of the dispersed particles, certain nanocomposites can exhibit improved mechanical, thermal and optical properties as compared to pure polymers or conventional composites.

The most commonly used and investigated types of polymer nanocomposites are those based on clays and layered silicates. The nanocomposites are typically obtained by the intercalation or penetration of the polymer (or a monomer subsequently polymerized) inside galleries of layered clay material and the subsequent exfoliation, or dispersion, of the intercalate throughout the polymer matrix.

The matrix polymer of the polyolefin resin blend typically constitutes a nonpolar, organic material, whereas the clay mineral is a much more polar, inorganic material. This incompatibility hinders the direct intercalation or exfoliation of the clay in the typical polymer blend. Various methods have been tried in the prior art in an attempt to overcome this problem and thereby increase the dispersion of the clay mineral in the polymer matrix.

For example, U.S. Pat. No. 5,910,523 discloses a composition comprising a semi-crystalline polyolefin, a clay filler having dispersible platelets in stacks, an amino-functional silane reacted with the filler, and a carboxylated or maleated semi-crystalline polyolefin that has been reacted with the amino-functional silane after the silane was reacted with the filler.

U.S. Pat. No. 6,228,903 discloses a composition made by contacting a phyllosilicate material that is exfoliated in an organic solvent with a polymer/carrier composition that includes a water-insoluble polymer and a solvent, whereupon the adherent solvent is driven off.

U.S. Pat. No. 6,451,897 discloses a composite material made in a substantially non-oxidizing environment by graft polymerizing a liquid monomer onto a propylene resin in the presence of smectite clay and a free radical initiator. The propylene resin is a porous material, wherein more than 40% of the pores have a diameter greater than 1 micron. The liquid monomer may be a vinyl-substituted aromatic, a vinyl ester, or an unsaturated aliphatic nitrite or carboxylic acid.

U.S. Pat. No. 6,462,122 discloses a nanocomposite blend containing a layered silicate material, a matrix polyolefin, and a functionalized polyolefin (i.e., maleic-anhydride-modified polypropylene) that may be blended together in, for example, a twin-screw extruder.

Despite these prior art formulations, however, incorporating clay minerals into a polymer matrix may not always result in markedly enhanced mechanical or physical properties. This may be due in part to the inability to exfoliate all or at least a substantial portion of the layers of the silicate material. It may also be due in part to the lack of affinity between the layered silicate materials and the organic polymers. There remains a need to obtain polymeric materials that have a good level of mar/scratch resistance along with the physical property requirements of rigidity, strength, processability, barrier properties, clarity, gloss, and thermal stability.

SUMMARY OF THE INVENTION

The invention encompasses ionomeric nanocomposites that include a nanostructured material, and a propylene-based polyolefin-metal salt component that is a reaction product of at least one propylene-containing homopolymer or copolymer and at least one organic monomer containing at least one hydrophilic moiety, the reaction product being sufficiently neutralized with a metal ion component to decrease the opacity of the ionomeric nanocomposite. In a preferred embodiment, the nanostructured material is present in an amount from about 0.0001 to 200 parts by weight per 100 parts by weight of the propylene-based polyolefin-metal salt component.

The metal ion component preferably includes lithium, sodium, potassium, magnesium, calcium, barium, lead, tin, zinc, aluminum, or a combination thereof.

One embodiment is where each of the hydrophilic moieties includes an ethylenically unsaturated carboxylic acid monomer. In a preferred embodiment, the ethylenically unsaturated carboxylic acid monomer includes methacrylic acid, acrylic acid, itaconic acid, maleic anhydride, or mixtures thereof.

Each of the nanostructured materials can include one or more aluminosilicates, carbonaceous materials, layered double hydroxides, or mixtures thereof. In preferred embodiments, the aluminosilicates include polysilicates, phyllosilicates, tectosilicates, tetrasilicates, zeolites, or mixtures thereof; the carbonaceous materials comprise carbon nanoparticles, diamondoids, porous carbons, graphites, microporous hollow carbon fibers, single-walled carbon nanotubes, multi-walled carbon nanotubes, fullerenes, or mixtures thereof; and the layered double hydroxides comprise hydrotalcite, hydrotalcite-like materials, or mixtures thereof.

In a preferred but optional embodiment, the ionomeric nanocomposite can further include a polymeric component present in an amount of about 1 to 300 parts by weight that includes functionalized or non-functionalized propylene polymers, functionalized or non-functionalized ethylene polymers, functionalized or non-functionalized styrenic block copolymers, hydrogenated styrene butadiene random copolymers, ethylene ionomers, styrenic block ionomers, polyurethanes, polyesters, polycarbonates, polystyrenes, or mixtures thereof.

In yet another preferred but optional embodiment, the ionomeric nanocomposite can further include a property modifying agent present in an amount of about 0.001 to 100 parts by weight and comprising one or more of thermal stabilizers, plasticizers, mold release agents, processing aids, nucleating agents, clarifying agents, antioxidants, ultraviolet light stabilizers, hindered amine light stabilizers, color concentrates, special effect pigments, mineral fillers, or combinations thereof.

The invention also encompasses extruded articles, thermoformed articles, and molded articles, each of which can be formed with the propylene-based polyolefin-metal salt component being present in an amount sufficient to increase the clarity of the extruded article compared to an extruded, thermoformed, or molded article that is free of the propylene-based polyolefin-metal salt component.

In one embodiment, the article is formed as a coating or a coextruded, multi-layer film or sheet. In a preferred embodiment, the coextruded, multi-layer film or coating forms at least an outermost layer of the article. One preferred article is a container formed from the ionomeric nanocomposite of the invention. In a preferred embodiment, the container contains a gas-sensitive consumable product, such as a food or beverage, pharmaceutical, or cosmetic, e.g., a perfume.

The invention also encompasses methods of preparing ionomeric nanocomposites by providing 100 parts by weight of a propylene-based polyolefin-metal salt component, from about 0.0001 to 200 parts by weight of nanostructured material, optionally a polymeric component, and optionally a property-modifying agent, and melt blending the components sufficiently to provide a blend that is at least substantially homogeneous. In one embodiment, the method further includes thermoforming, molding, or extruding the at least substantially homogeneous blend so as to form an article.

DETAILED DESCRIPTION OF THE PREFERRED EMBODIMENTS

It has now been discovered that polymeric blends can be obtained that have a superior level of mar/scratch resistance, clarity, or both, along with the necessary physical property requirements. These physical property requirements can include rigidity, strength, processability, barrier properties, gloss, thermal stability, or any suitable combination thereof. The present invention provides these polymeric blends by combining a nanostructured material and a propylene-based polyolefin-metal salt component that is a reaction product of at least one propylene-containing homopolymer or copolymer and at least one organic monomer containing at least one hydrophilic moiety, the reaction product being sufficiently neutralized with a metal ion component to decrease the opacity of the ionomeric nanocomposite. Preferably, the ionomeric nanocomposite contains about 0.0001 to 200 parts by weight of a nanostructured material per 100 parts by weight of the propylene-based polyolefin-metal salt component. In one more preferred embodiment, from about 0.01 to 150 parts by weight of the nanostructured material per 100 parts by weight of the propylene-based polyolefin-metal salt component can be included in the ionomeric nanocomposite.

The propylene-based polyolefin-metal salt component of this invention includes one or more propylene-based polyolefin metal salts, each having a backbone of a homopolymer or one or more copolymers of propylene and up to about 20 mole percent ethylene or other alpha-olefins having up to about 12 carbon atoms, or a combination thereof. If a copolymer, this polyolefin backbone can be random, block or graft with a $C_2$ to $C_{20}$ alpha olefin or a combination thereof. At least a fraction of this polyolefin backbone is preferably grafted with an unsaturated organic compound containing at least one site of unsaturation and at least one carbonyl, carboxyl, epoxy, or other hydrophilic group.

When included, these functional moieties are added to the polyolefin backbone in an amount of at least about 0.01 weight percent, preferably at least about 0.1 weight percent, and more preferably at least about 0.5 weight percent, based on the combined weight of the polymer and the hydrophilic organic compound. The maximum amount of unsaturated organic compound content can vary as desired, but typically it should be no more than about 25 weight percent, often it should be no more than about 10 weight percent, and in certain preferred cases it should be no more than about 5 weight percent, based on the combined weight of the polymer and organic compound.

An unsaturated hydrophilic organic compound can be grafted to the base polymer by any technique known to one of ordinary skill in the art, such as that taught in U.S. Pat. No. 4,950,541, the disclosure of which is incorporated herein by express reference thereto. The base polymer and unsaturated organic compound are mixed and reacted within a twin-screw devolatilizing extruder at temperatures at which the reactants are molten and in the presence of a free radical initiator. Preferably, the unsaturated organic compound is injected into a zone maintained under pressure within the extruder.

Any hydrophilic monomer that can be neutralized, such as one or more unsaturated carboxylic acid monomers, can be used in the manufacture of functionalized polyolefins of this invention. Representative unsaturated organic compounds that include at least one carbonyl group include the ethylenically unsaturated carboxylic acids, anhydrides, esters, and their salts, both metallic and nonmetallic, and combinations thereof. Preferably, the organic compound includes ethylenic unsaturation conjugated with the carbonyl group. Representative compounds include maleic, fumaric, acrylic, methacrylic, itaconic, crotonic, alpha-methyl crotonic, cinnamic, and the like, acids and their anhydride, ester and salt derivatives, if any, and any combinations thereof. Preferred combinations of functionalizing compounds include those such as acrylic acid/methacrylic acid mixtures. Preferably, maleic anhydride, acrylic acid, itaconic acid, methacrylic acid, or combinations thereof are used.

The functionalized polymer, or "reaction product" thereof, is then advantageously neutralized with a metal ion component, typically one or more alkali or alkaline-earth containing compounds, typically in salt or base form, to form the functionalized polyolefin-metal salt component. Preferably, the acid moiety on the functionalized polyolefin-metal salt component in a blend of this invention is neutralized about 30 to about 100 percent, preferably at least about 40 percent, more preferably at least about 60 percent. The acid moiety is preferably neutralized with one or more alkali or alkaline earth metals, but other cations, or blends thereof, can be used. Examples of suitable cations that can be included in the metal cation component include lithium, sodium, potassium, magnesium, calcium, barium, lead, tin, zinc, aluminum, or a combination thereof. The preferred cations are zinc, lithium, sodium, calcium, magnesium, or a combination thereof. These cations are preferably added as bases to increase the degree of neutralization of acid moieties. Examples of other compounds particularly suitable for use in the metal ion component include sodium carbonate, zinc acetate dihydrate, zinc hydroxide, calcium oxide, calcium hydroxide, magnesium oxide, magnesium hydroxide, zinc stearate, calcium stearate, or combinations thereof. The metal-ion containing compounds include at least about 0.01 weight percent and no more than 20 weight percent of the functionalized polymer of the present invention. In one preferred embodiment, the metal-ion containing compounds include about 0.01 weight percent up to 10 weight percent, while in another embodiment they are present in an amount of about 5 weight percent up to 20 weight percent.

Exemplary functionalized polyolefins are also commercially available from Crompton Corporation (formerly Uniroyal Chemical Company) of Greenwich, Conn. as POLYBOND and from Eastman Chemical Company of Kingsport, Tenn. as EPOLENE.

Suitable nanostructured materials (also interchangeably referred to herein as "nanomaterials") under proper conditions are defined herein as materials having at least one dimension in the nanometer-size. A nanometer (nm) is $10^{-9}$ meter, therefore, nanometer-size range encompasses from about 1 to 999 nm. The nanostructured materials may be natural, modified, or synthetic in nature, or any combination thereof.

Nanostructured materials particularly suitable for use according to the invention include one or more of the following categories of nano-sized materials: nanoparticles, multilayers (nanofilms), nanocrystalline and nanoporous material, nanocomposites, and nanofibers (nanotubes and nanowires), and any combination thereof. A nanostructured material might, for example, contain a single nanocrystalline material or it might contain two nanocomposites combined with a type of nanoparticle. Nanocrystalline materials, for example, are crystallites of about 1 to 10 nm in dimension where an ultrahigh surface-to-volume ratio can be readily achieved. Nanoporous materials, on the other hand, are characterized by the molecular assembly of structures consisting of nanometer-sized cavities or pores. Typical nanostructured materials of the present invention may be composed of aluminosilicates, carbonaceous materials, layered double hydroxides, or mixtures thereof.

Aluminosilicate nanostructured materials include, but are not limited to, polysilicates such as wollastonite, phyllosilicates such as the smectite group of clay minerals, tectosilicates such as zeolites, tetrasilicates such as kenyaite, and zeolites. Natural or synthetic phyllosilicates, for example, are sheet structures basically composed of silica tetrahedral layers and alumina octahedral layers. Phyllosilicates are a preferred type of structured nanomaterial, and a preferred type of phyllosilicate includes one or more smectite clays alone or in combination with other compatible structured nanomaterials. Additional examples of phyllosilicates useful in the present invention include, but are not limited to, montmorillonite, nontronite, beidellite, hectorite, saponite, sauconite, kaolinite, serpentine, illite, glauconite, sepiolite, vermiculite, or mixtures thereof. Though not restricted in particular, the total cation exchange capacity of the phyllosilicates can preferably be 10 to 300 milliequivalents, more preferably from 50 to 200 milliequivalents, per 100 grams of the phyllosilicate material. Phyllosilicate nanomaterials (i.e., nanoclays) are commercially available from Nanocor, Inc. of Arlington Heights, Ill. as NANOMER and from Southern Clay Products, Inc. of Gonzales, Tex. as CLOSITE.

Tectosilicates and tetrasilicates are another class of synthetic or natural aluminosilicates that are crystalline porous nanostructures having long-range crystalline order with pore sizes that may be varied from about 2 Å to 200 Å (Angstroms). The zeolite aluminosilicates may be divided into those with a fibrous habit and an underlying chain structure (i.e., natrolite); those with a platy habit and an underlying sheet structure (i.e., heulandite); and those with an equant habit and an underlying framework structure (i.e., chabazite). Zeolites may be synthesized by any technique known to those who are skilled in the art, such as that taught in U.S. Pat. No. 5,098,684, which is incorporated herein by express reference thereto.

The carbonaceous nanomaterials of the present invention include fullerenes, carbon nanoparticles, diamondoids, porous carbons, graphites, microporous hollow carbon fibers, single-walled nanotubes and multi-walled nanotubes. Fullerenes typically consist of 60 carbon atoms joined together to form a cage-like structure with 20 hexagonal and 12 pentagonal faces symmetrically arrayed. Preferred fullerene materials include $C_{60}$ and $C_{70}$, although other "higher fullerenes" such as $C_{76}$, $C_{78}$, $C_{84}$, $C_{92}$, and so forth, or a mixture of these materials, could conceivably be employed. Graphite is a crystalline form of carbon comprising atoms covalently or metallically bonded in flat layered planes with weaker van der Waals bonds between the planes.

Diamondoids are three-dimensional polycyclic organic compounds that may be substituted or unsubstituted. The term "lower diamondoids" refers to all isomers and stereoisomers of adamantane, diamantane, triamantane, or mixtures thereof. The term "higher diamondoids" refers to all isomers and stereoisomers of tetramantane, pentamantane, hexamantane, heptamantane, octamantane, nonamantane, decamantane, undecamantane, or mixtures thereof. The lower diamondoids may be synthesized or refined from a natural gas stream in a two stage separation process, e.g., as described in U.S. Pat. No. 4,952,748, the disclosure of which is incorporated herein by express reference thereto. The higher diamondoids may be isolated or purified from natural gas condensates or refinery streams through pyrolysis, distillation, pyrolysis/distillation, preparative gas chromatography, high performance liquid chromatography, crystallization, recrystallization, thermal diffusion, or fractional sublimation, as described in WO 02/058139.

Carbon nanotubes may be a single layer or multiple layers of the hexagonal lattice graphite, wrapped into a cylindrical tube, typically of about 1 nanometer diameter, but up to several microns long. This gives an aspect (or length-to-diameter) ratio that can be in excess of 10,000. The nanotubes may be further grown into partially ordered two-dimensional bundles, or "ropes" formed from individual nanotubes. Carbon nanotubes are typically prepared from the decomposition of carbon-containing gases over selected catalytic metal surfaces at temperatures ranging from about 500° C. to about 1,200° C., such as that described in U.S. Pat. No. 6,517,800, the disclosure of which is incorporated herein by express reference thereto.

A layered double hydroxide material (LDH) of the present invention is composed of small crystalline sheets of submicron dimensions, between which anions are located. U.S. Pat. No. 4,904,457, which is hereby incorporated herein by express reference thereto, describes possible methods of preparation for a synthetic layered double hydroxide. Preferably, the layered double hydroxide has a large contact surface and an ion exchange capacity of 20 to 600 milliequivalents per 100 grams. An LDH preferably used is a hydrotalcite or a hydrotalcite-like material, because these materials can be readily prepared synthetically and the desired properties can be closely controlled during synthesis as will be readily determined by those of ordinary skill in the art.

The nanostructured materials of the present invention can include refined but unmodified nanomaterials, modified nanomaterials, synthetic nanomaterials, or mixtures thereof. The nanomaterials of the present invention may be dispersed directly into the propylene-based polyolefin metal salt, or may be dispersed with further intercalation processing, or some combination thereof. The intercalation processes may be conducted before, during, or after mixing the nanomaterials with the propylene-based polyolefin metal salts. However, it is not intended that these methods be limited to any specific process or procedure, and any suitable intercalation or combination thereof available to those of ordinary skill in the art may be used in accordance with the invention described herein.

"Intercalation" is defined as the insertion of mobile guest species (atoms, molecules, or ions) into a crystalline host lattice that contains an interconnected system of empty lattice sites of appropriate size. Intercalation is typically reversible, meaning that the structural integrity of the host lattice is formally conserved in the course of forward and reverse reactions.

An intercalated nanostructured material may be prepared, e.g., by the reaction of one or more swellable nanomaterials with a swelling agent of one or more organic molecules or cations. The process to prepare the intercalated nanomaterials may be conducted in a batch, semi-batch, or continuous manner. Numerous methods to modify nanomaterials with organic cations, such as those taught in U.S. Pat. No. 4,810,734, which is incorporated herein by express reference thereto, are known, and any of these may be used in the practice of this invention.

Organic molecules suitable as swelling agents include cationic surfactants such as ammonium, phosphonium or sulfonium salts; amphoteric surface active agents; derivatives of aliphatic, aromatic or arylaliphatic amines, phosphines and sulfides; and organosilane compounds. Other suitable swelling agents include protonated amino acids and salts thereof containing 2–30 carbon atoms such as 12-aminododecanoic acid, epsilon-caprolactam and like materials. A preferred swelling agent includes ammonium to effect partial or complete cation exchange. The intercalation process results in the development of intercalates which are more organophilic and which can be more readily exfoliated (dispersed) during admixture with a polymer to form an ionomeric nanocomposite. These intercalates are typically on the order of 1 nanometer thick, but about 100 to 1,000 nanometers across. This high aspect ratio, and the resulting high surface area, provides high reinforcement efficiency at low loading levels.

Intercalation may also be accomplished by dispersing the nanostructured materials in a solution containing an oxidizing agent, e.g., a mixture of nitric and sulfuric acid, as described in U.S. Pat. No. 3,404,061, the disclosure of which is incorporated herein by express reference thereto. The intercalation solution contains oxidizing and other intercalating agents known in the art. Examples include those containing oxidizing agents and oxidizing mixtures, such as solutions containing one or more of nitric acid, potassium chlorate, chromic acid, potassium permanganate, potassium chromate, potassium dichromate, perchloric acid, and the like, or mixtures of a strong organic acid, e.g., trifluoroacetic acid, and a strong oxidizing agent soluble in the organic acid. The intercalation solutions may further include electron donors (e.g., alkali metals, alkaline-earth metals, lanthanides, metal compounds containing hydrogen or polar molecules, and aromatic compounds) or electron acceptors (halogens, halides, oxyhalides, and acids) in an organic solvent. After intercalation, excess solution is removed, typically by driving off the solution by heat treating the mixture. In addition, the intercalation process may use an electrolytic intercalation solution in which the nanostructured material is subjected to electrolysis, dried, and then heated to temperatures up to 1,000° C.

In another method of intercalation, a metal-containing compound may be vaporized, and the vapor of the metal-containing compound is then contacted with the nanostructured material, thereby intercalating or doping the nanomaterial. The intercalation reaction may take place when the nanomaterial is heated with weighed quantities of the metal-containing compound in an evacuated vessel, or when the metal-containing compound and the nanomaterial are heated in separated vessels, e.g., the two-bulb method. However, the method of doping is not limited, and other methods, such as sputtering, sublimation, solution coating, dispersion coating, or laser ablation, could be used to achieve doping. The reaction can be carried out at temperatures of from about −40 to 250° C., preferably from about 0 to 200° C. It can also be carried out under pressure, e.g., at from about 1 to 100 atm, preferably from about 1 to 10 atm. Furthermore, the reaction can be carried out photochemically, e.g., in the presence of a mercury vapor lamp.

Significant levels of incomplete dispersion not only lead to an exponential reduction in the potential barrier improvements attributable to the nanomaterials, but also can lead to deleterious effects to other properties inherent to polymer resins such as strength, thermal stability, and processability. Simply treating the nanostructured material may, however, be insufficient to generate a reaction with nonpolar polyolefins. Most reports of increased mechanical properties using nanocomposites have been obtained by utilizing the more reactive polyamides in the polymer matrix. In order to incorporate the use of polyolefins, the polarity of the polymer matrix must be enhanced by adding a functional monomer with a pendant reactive polar group to at least a small percentage of the polyolefin blend, as described above. The present invention has surprisingly and unexpectedly shown that neutralizing the functionalized monomer with a metal ion component can further increase the mechanical properties of the nanocomposite by further reducing the interfacial tension and by acting as a nucleating agent for the main polyolefin component of the nanocomposite.

Without being bound by theory, it is believed that the combination of neutralizing the functionalized monomer with a metal ion component and treating the nanostructured material via an intercalation process increases the compatibility of the two components. The ionic interaction between the nanomaterial and the propylene-based polyolefin-metal salt is thought to be stronger than the internal bonds of the nanostructured material, thereby increasing the interaction between the two components and therefore increasing dispersion of the nanomaterial within the polymer matrix to at least substantially disperse the nanomaterial(s) in the polymer matrix.

When at least one intercalation process has been conducted on the nanomaterial, multi-layered nanostructured materials (e.g., phyllosilicates, tectosilicates, tetrasilicates, carbon nanotube ropes, multiple walled carbon nanotubes, and layered double hydroxides) may be advantageously dispersed under conditions such that at least about 50, preferably at least about 70, and more preferably at least about 85 weight percent of the layers of the intercalated, multi-layered nanomaterial present in the ionomeric nanocomposite have a greater interlayer spacing than the layered nanomaterial before it is added to the polymer matrix. Without being bound by theory, it is quite probable that the layers of the nanomaterial will not disperse or delaminate completely in the polymer, but will form layers in a coplanar aggregate. These layers are advantageously sufficiently dispersed or delaminated in the matrix polymer such that a significant portion of the layers have an interlayer spacing greater than about 30 Å, preferably about 50 Å. Preferably at least about 50% of the layers will exhibit this type of spacing, more preferably greater than about 70% of the interlayer spacing will be greater than about 50 Å.

The dimensions of the dispersed delaminated layers may vary greatly, but in the case of particles derived from phyllosilicate materials, the particle faces are typically roughly hexagonal, circular, elliptical or rectangular and exhibit maximum diameters or length from 50 Å to 50,000 Å. As such, the aspect ratio will be from about 5 to 5,000 assuming a typical layer thickness of approximately 10 Å. The aspect ratio which is most advantageously employed will depend on the desired end-use properties.

The ionomeiic nanocomposite blend of the present invention may, in addition, contain optional polymeric components, including functionalized or non-functionalized propylene polymers, functionalized or non-functionalized ethylene polymers, functionalized or non-functionalized styrenic block copolymers, hydrogenated styrene butadiene random copolymers, ethylene ionomers, styrenic block ionomers, polyurethanes, polyesters, polycarbonate, polystyrene, or mixtures thereof and may be present in an amount of about 1 to 300 parts by weight per 100 parts by weight of the propylene-based polyolefin-metal salt and the nanostructured material. In one preferred embodiment, the optional polymeric components are present in an amount of about 1 to 200 parts by weight.

The optional propylene polymers or ethylene polymers, which may be functionalized or non-functionalized, are chosen from one or more of homopolymers of propylene, homopolymers of ethylene such as polyethylene, low density polyethylene, or high density polyethylene, copolymers of propylene and at least one other $C_2$ to $C_{20}$ alpha-olefin, copolymers of ethylene and at least one other $C_3$ to $C_{20}$ alpha-olefin, terpolymers of ethylene, an alpha-olefin, and a non-conjugated diene monomer, or mixtures thereof. Preferred alpha-olefins for such propylene and/or ethylene copolymers include ethylene, 1-butene, 1-pentene, 1-hexene, methyl-1-butenes, methyl-1-propenes, methyl-1-pentenes, methyl-1-hexanes, ethyl-1-hexenes, 1-octene, and 1-decene, or combinations thereof.

Examples of suitable non-conjugated diene monomers include straight chain, hydrocarbon di-olefin or cylcloalkenyl-substituted alkenes having from 6 to 15 carbon atoms, or combinations thereof. Specific preferred examples include one or more classes or species including (a) straight chain acyclic dienes such as 1,4-hexadiene and 1,6-octadiene; (b) branched chain acyclic dienes such as 5-methyl-1,4-hexadiene; 3,7-dimethyl-1,6-octadiene; 3,7-dimethyl-1,7-octadiene; (c) single ring alicyclic dienes, such as 1,4-cyclohexadiene; 1,5-cyclooctadiene and 1,5-cyclododecadiene; (d) multi-ring alicyclic fused and bridged ring dienes such as tetrahydroindene; methyl-tetrahydroindene; dicyclopentadiene (DCPD); bicyclo-(2.2.1)-hepta-2,5-diene; alkenyl, alkylidene, cycloalkenyl and cycloalkylidene norbornene, such as 5-methylene-2-norbornene (MNB), 5-propenyl-2-norbornene, 5-isopropylidene-2-norbornene, 5-ethylidene-2-norbornene (ENB), 5-(4-cyclopentenyl)-2-norbornene, 5-cyclohexylidene-2-norbornene, and 5-vinyl-2-norbornene (VNB); (e) cycloalkenyl-substituted alkenes, such as allyl cyclohexene, vinyl cyclooctene, allyl cyclodecene, vinyl cyclododecene; or any mixture of the above. Of the non-conjugated dienes typically used, the preferred dienes are dicyclopentadiene, 1,4-hexadiene, 5-methylene-2-norbornene, and 5-ethylidene-2-norbornene, or combinations thereof.

Exemplary propylene homopolymers or copolymers are commercially available as, for example, PROFAX, ADFLEX and HIFAX from Basell North America, Inc. of Wilmington, Del., as FORTILENE, ACCTUFF or ACCPRO from British Petroleum Chemicals of Houston, Tex., and as various types of polypropylene homopolymers and copolymers from ExxonMobil Chemicals Company of Houston, Tex., from Borealis A/S from Lydgby, Denmark, from Sunoco Chemicals of Pittsburgh, Pa., and from Dow Chemical Company of Midland, Mich. The propylene-based polyolefin-metal salt component can also include these or any other suitable propylene-based homopolymers or copolymers. The propylene homopolymers or copolymers may be functionalized with a hydrophilic or polar group as described above.

Exemplary ethylene homopolymers and copolymers are commercially available as, for example, ALATHON from Equistar Chemicals of Houston, Tex., as MARLEX from ChevronPhillips of Houston, Tex., as FORTIFLEX from Solvay America of Houston, Tex., as VISTALON or ESCORENE from ExxonMobil of Houston, Tex., as NORDEL from DuPont Dow Elastomers LLC of Wilmington, Del., as DUTRAL from Polimeri Europa Americas of Houston, Tex., as BUNA EP from Bayer Corporation of Pittsburgh, Pa., as KELTAN from DSM Elastomers America of Baton Rouge, La., or as ROYALENE from Crompton/Uniroyal Chemicals of Middlebury, Conn. The ethylene homopolymers or copolymers may be functionalized with a hydrophilic or polar group as described above, or may be further crosslinked or even uncrosslinked.

The optional styrenic block copolymers include, but are not limited to, copolymers of styrene, ethylene and another alkene. Exemplary copolymers include styrene-ethylene/butylene, styrene-ethylene/butylene-styrene, styrene-ethylene/propylene, styrene-ethylene/propylene-styrene, styrene-ethylene/propylene-styrene-ethylene-propylene, styrene-butadiene, styrene-butylene-styrene, styrene-isoprene-styrene, and hydrogenated variations or any combinations thereof. Suitable styrenic block copolymers also include styrene-butadiene-styrene, styrene-butene-butadiene-styrene, alpha-methylstyrene-butadiene-alpha-methylstyrene, alpha-methylstyrene-isoprene-alpha-methylstyrene, and the like, or combinations thereof. The structure of the styrene block copolymers useful in the present invention can be of the linear or radial type, and of the di-block or tri-block type.

Among the polar groups that may be reacted or combined with such styrenic block copolymers to produce a functionalized styrenic block copolymer useful in the present invention are those previously discussed for functionalizing the propylene-based metal salts of the present invention. These can be independently selected to be the same or different from the propylene-based metal salt functionalizing group (s). Exemplary styrenic block copolymers functionalized with a polar group are commercially available, for example, as KRATON from Kraton Polymers of Houston, Tex., as SEPTON from Kuraray Company Ltd. of Pasadena, Calif., and as TUFTEC from Asahi America Inc. of Malden, Mass.

The optional styrenic block ionomer is chosen from, e.g., unsaturated or saturated (i.e., hydrogenated or non-hydrogenated) styrenic block copolymers functionalized with at least one polar group, and the functionalized block copolymer is at least partially neutralized with a metal ion component. Styrenic block copolymers useful in providing styrenic block ionomers include a styrenic block segment and an elastomeric block segment that can optionally, but in one embodiment preferably, be hydrogenated. The styrenic block segment is preferably a polymer of styrene and/or its analogs and homologs, including alpha-methylstyrene, and ring-substituted styrenes, particularly ring-methylated styrenes. The preferred styrenics are styrene and alpha-methylstyrene, with styrene being especially preferred. The elastomeric block segment of the above styrenic block copolymer may be ethylene, butylene, butadiene, isoprene, propylene, or a combination thereof.

Another optional component that can be included in the ionomeric nanocomposites of the invention is a polymeric metal salt component that is a reaction product of a random styrenic copolymer which includes an unsaturated dicarboxylic acid derivative incorporated into a styrene or other polymeric backbone, which reaction product is at least partially neutralized with a metal ion component. Alternatively, the polymeric metal salt is a random terpolymer of styrene, butadiene, and an unsaturated dicarboxylic acid derivative, or a reaction product thereof, which is at least partially neutralized with a metal ion component. In one embodiment, the polymeric metal salt can include both the random styrenic copolymer reaction product and the neutralized random terpolymer. The preferred styrenic materials include styrene and alpha-methylstyrene, with styrene being especially preferred. Examples of a suitable unsaturated dicarboxylic acid derivative includes maleic acid, maleic anhydride, fumaric acid, mesaconic acid, itaconic acid, itaconic anhydride, and monomethyl maleate, or any combination thereof.

Procedures for preparing such random styrenic copolymers are known in the art and have been described in, for example, U.S. Pat. No. 2,971,939, which is incorporated herein by express reference thereto. Impact-modified versions can be produced for use according to the invention, for example, by copolymerizing the styrenic components and the unsaturated dicarboxylic acid derivative components in the presence of polybutadiene. Styrene-maleic anhydride copolymers, for example, are commercially available as DYLARK from Nova Chemicals Corporation of Calgary, Alberta, Canada, as CADON from Bayer Corporation of Pittsburgh, Pa., and as STAPRON from DSM Engineering Plastic Products, Inc. of Reading, Pa.

The reaction product of a random styrenic copolymer, which includes a polar group incorporated into the optional styrene backbone, is then advantageously at least partially neutralized with a metal ion component, typically one or more alkali or alkaline-earth containing compounds, for example a salt or a base, to form the styrenic ionomer(s). In a preferred embodiment, the polar group includes one or more unsaturated dicarboxylic acid derivatives. Preferably, each type of polar group is neutralized about 30 to 100 percent, more preferably at least about 40 percent, and most preferably at least about 60 percent. The metal ion component may be selected from the group previously described herein.

The optional ethylene ionomers, for example those sold under the trademark SURLYN by E. I. DuPont de Nemours and Co. of Wilmington, Del. or under the trademark IOTEK by ExxonMobil Chemical Company of Houston, Tex., are suitable for use in the ionomeric nanocomposite blend of the invention. These ionomer resins are a copolymer of an ethylene and an alpha, beta-ethylenically unsaturated carboxylic acid with 10 to 90 percent of the carboxylic acid groups neutralized by a metal ion component. Commercially available ionomer resins typically include copolymers of ethylene and methacrylic or acrylic acid.

The optional functionalized ethylene homopolymer or copolymer, hydrogenated styrene butadiene random copolymer, styrenic block copolymer functionalized with at least one polar group, which forms the basis of the styrenic ionomer and/or the functionalized polyolefin that is included in a blend with the propylene-based polyolefin-metal salt component, may be subsequently sulfonated before the optional neutralization step with a metal ion component. Techniques for sulfonating polymers are well known to those of ordinary skill in the art, such as the one taught in U.S. Pat. No. 4,184,988, the disclosure of which is incorporated herein by express reference thereto. In the '988 patent, acetyl sulfate was added to a solution of EPDM and heptane; the reaction was terminated after 1 hour with the addition of isopropyl alcohol. This optional step results in a polymer containing both sulfonated and carboxylated groups, and this is preferred in one embodiment.

The copolymers, including terpolymers and ionomers, used in the optional polymeric component of the present invention can be made according to any of the various means available to the ordinary-skilled artisan in this field, such as by addition free radical polymerization, cationic or anionic polymerization, or catalyst driven polymerization, to name but a few. As the ordinary-skilled artisan in this field knows, each of these different methods can be used to produce different types of copolymers having two or more units, such as graft polymers, block polymers, random polymers, etc., as desired.

An exemplary ionomeric nanocomposite blend might include: a reaction product of a propylene-containing polymer functionalized with a hydrophilic moiety, in particular carboxylic acids, that is at least partially neutralized with a metal ion component; and a nanostructured material.

In an embodiment, the ionomeric nanocomposite blend includes copolymers of propylene and carboxylic acid monomers substituted for some of the propylene-based polyolefin-metal salt(s).

In another embodiment, the ionomeric nanocomposite blend might include: a reaction product of a propylene-containing polymer functionalized with a hydrophilic moiety, in particular carboxylic acids, that is at least partially neutralized with a metal ion component; a nanostructured material; optionally, an ethylene ionomer; optionally, a propylene-containing polymer; propylene and an alpha-olefin copolymer, i.e., an ethylene-propylene copolymer; optionally, a copolymer of ethylene and alpha-olefin, optionally including at least one diene; and optionally, a styrenic block copolymer.

In yet another embodiment, the optional polymeric components when used with at least one polypropylene-based metal salt and at least one nanostructured material may further include polypropylene or polyethylene homopolymers and/or copolymers, or mixtures thereof, and/or copolymers of propylene and carboxylic acid or anhydride monomers, and styrenic block ionomers formed from SEBS modified with a polar group, which modified SEBS is then at least partially neutralized with a metal ion component. In a preferred embodiment, each of these components will be included in a polyolefin blend of the invention.

In another embodiment, the optional polymeric components can further include a reaction product of a random styrenic copolymer which includes an unsaturated dicarboxylic acid derivative incorporated into the styrene backbone, each reaction product separately or concurrently being at least partially neutralized with a metal ion component.

In yet another embodiment, the propylene-based polyolefin-metal salt component blends of the invention are preferably essentially free of ethylene ionomers, essentially free of styrene-based ionomers, or essentially free of both. The term "essentially free," as used herein, means that the polymer resin blend including at least one polypropylene-based metal salt and at least one nanostructured material, e.g., phyllosilicate material, has less than about 10 parts by weight of the limited material, e.g., ethylene ionomers, preferably less than about 5 parts by weight, and more preferably less than about 1 part by weight, e.g., ethylene ionomers. In one preferred embodiment, "essentially free" means less than 0.1 part by weight of such an ethylene ionomer, styrene-based ionomer, or both. "Completely free" means no more than a trace amount of any such materials, preferably no detectable amounts.

The ionomeric nanocomposite blends may optionally include a property-modifying agent to the extent that the presence of any such additives included within the agent does not interfere with the performance of the compositions of the invention, e.g., the scratch and mar resistance. Examples of optional property-modifying agents include, but are not limited to, thermal stabilizers, plasticizers, mold release agents, processing aids, nucleating agents, clarifying agents, antioxidants, ultraviolet light stabilizers, hindered amine light stabilizers, and the like, or any combinations thereof, to vary the resultant properties.

Another class of property-modifying ingredients is color concentrates, such as organic or inorganic pigments, or special effect pigments, such as metallic flakes or pearlescent pigments, which when optionally included are typically present at concentrations ranging from about 0.01 to about 20 parts, typically from about 1 to about 10 parts by weight. Special effect pigments or flakes produce color due to light interference and are known as interference flakes or interference pigments. Interference occurs through the interaction of light rays of the upper and lower surfaces of the transparent platelet. Changes in the platelet thickness affect the interference color so that the transmission and reflection interference colors are different. Titanium-dioxide-coated mica is the most common interference flake pigment. Normal pigments can also be coated onto the mica along with titanium dioxide, resulting in combination pigments. Thin film vapor deposition technology has also been used to create interference pigments with high chroma and metallic characteristics. Because the color results from interference alone, the change in color with each small change in geometry is dramatic.

Another example of a class of property modifying ingredients is fillers. The filler can include one or more treated or untreated inorganic materials, such as talc, calcium carbonate, alumina trihydrate, barium sulfate, calcium sulfate, carbon black, metal fibers, boron fibers, ceramic fibers, polymeric fibers, glass, ceramic, carbon or polymeric microspheres, mica, glass fibers, carbon fibers, fibrous magnesium oxysulfate, or a combination thereof. The filler can optionally be present in an amount from about 0 to about 80 parts by weight, typically from about 0.1 to 75 parts by weight. When included, the mineral filler is preferably present in an amount from about 1 to about 50 parts by weight.

The property-modifying agents together, including one or more of the fillers, coloring agents, processing aids, clarifying agents, nucleating agents, antioxidants, and the like, are preferably present in an amount of about 0.001 to 100 parts by weight per 100 parts by weight of the propylene-based polyolefin-metal salt and the nanostructured material. In one preferred embodiment, the property-modifying agent is present in an amount of about 0.01 to 75 parts by weight.

Each optional ingredient can be admixed with the polyolefin, nanostructured material, and other ingredients during manufacture of the blend. The present invention includes a method of manufacture of the above blends by, for example, extrusion. The ionomeric nanocomposite blends of this invention are mixed by any conventional manner that insures the creation of a relatively homogeneous blend, i.e., at least substantially homogeneous.

One method of manufacturing propylene-based polyolefin-metal salts includes the steps of contacting a propylene-containing polymer and at least one organic monomer containing at least one hydrophilic moiety under conditions such that the propylene polymers are functionalized with each hydrophilic moiety, and neutralizing the reaction product with a metal ion component.

The manufacture of propylene-based polyolefin-metal salts may be performed in a single reaction mass. Optionally, such reactions may also be performed in a one-step process using one or more functional oligomeric salts.

The method of manufacturing an ionomeric nanocomposite blend of the invention includes providing one or more of each of: propylene-based polyolefin-metal salt component, nanostructured material, any optional polymeric components, and any optional property-modifying agents, and blending the components to make a homogenous blend.

The functionalized propylene-based polyolefin-metal salt component may be formed continuously and simultaneously via melt blending of the primary components of the present invention (i.e., the propylene-containing polymer functionalized with a hydrophilic moiety, and the metal-ion containing component). Techniques for melt blending of a polymer with optional additives of all types are known in the art and can typically be used in the practice of this invention. Typically, in a melt blending operation useful in the practice of the present invention, the individual components of the blend are combined in a mechanical extruder or mixer, and then heated to a temperature sufficient to form a polymer melt and effect the reactive modification. The mechanical mixer can be a continuous or batch mixer. Examples of suitable continuous mixers include single screw extruders, intermeshing co-rotating twin screw extruders such as Coperion Werner & Pfleiderer ZSK extruders, counter-rotating twin screw extruders such as those manufactured by LEISTRITZ, and reciprocating single screw kneaders such as BUSS co-kneaders. Examples of batch mixers are lateral 2-rotor mixers such as BANBURY or BOLING mixers.

The composite may be prepared by shear mixing each propylene-based polyolefin metal salt and the nanostructured material in the melt at a temperature equal to or greater than the melting point of the polymer. Melting point is defined as the first order transition temperature at which a crystalline solid changes from a solid state to a fluid state. The temperature of the melt, residence time of the melt within the mixer and the mechanical design of the mixer are several variables which control the amount of shear to be applied to the composition during mixing.

Alternatively, each propylene-based polyolefin metal salt may be granulated and dry-mixed with each nanomaterial, and thereafter, the composition heated in a mixer until the polymer is melted to form a flowable mixture. This flowable mixture can then be subjected to a shear in a mixer sufficient to form the desired ionomeric nanocomposite. The polymer may also be heated in the mixer to form a flowable mixture prior to the addition of the nanostructured material and then subjected to a shear sufficient to form the desired ionomeric nanocomposite. The amount of the nanostructured material most advantageously incorporated into the polyolefin is dependent on a variety of factors including the specific nanomaterials and polymers used to form the composite, as well as its desired properties.

In a preferred embodiment, the ionomeric nanocomposite blend is prepared by mixing the components in a modular intermeshing co-rotating twin-screw extruder, such as those manufactured by Coperion Werner & Pfleiderer under the trade name of ZSK. Other manufacturers of this type of equipment include co-rotating twin screw extruders from Berstorff, Leistritz, Japanese Steel Works, and others. The screw diameter for this type of mixer may vary from about 25 mm to 300 mm.

The mixing extruder includes a series of sections, or modules, that perform certain mixing functions on the composition. The polymeric components are fed into the initial feed section of the extruder as solid granules at the main feed hopper. Other ingredients, such as fillers, thermal stabilizers, and the like, as described above, may also be fed into the main feed hopper of the mixing extruder as dry powders or liquids. It is preferred that the majority of thermal stabilizers and UV stabilizers be added in a downstream section of the mixer, as described in U.S. Pat. No. 5,650,468.

The components are typically homogenized with an initial melting and mixing section of the extruder. The polymer melt temperature is raised by a sequence of kneading blocks to just above the highest softening point of the polymer blend. A melt temperature of about 160° C. to 230° C. is preferred for the first mixing section.

Subsequent to the first mixing section, there is a second mixing section of the extruder to perform kneading and distributive mixing. The mixing temperature in this section should be from about 160° C. and 225° C., preferably from about 170° C. and 220° C., in order to bring about sufficient dispersion of the nanostructured material in the polyolefin blend. The residence time within the second mixing section should be at least 10 seconds, but no more than 100 seconds to prevent excessive thermal degradation. Preferably, the nanostructured material is at least substantially uniformly dispersed within the polyolefin, and more preferably, it is uniformly dispersed within the polyolefin.

The final section of the mixing extruder uses melt compression prior to extrusion through a die plate. The melt compression can be accomplished with the co-rotating twin screw extruder, or melt compression can be done via a de-coupled process, such as a single screw extruder or a melt gear pump. At the end of the compression section, the composition is discharged through a die plate.

The ionomeric nanocomposite blend of the current invention may be pelletized via strand pelleting or commercial underwater pelletization. Pellets of the present composition may then be used to manufacture articles in the desired shape or configuration by any of a number of means well known to those of ordinary skill in the art, such as various types of conventional injection molding procedures, extrusion or co-extrusion procedures, compression molding procedures, thermoforming procedures, or the like. The present compositions are formulated to have a melt flow appropriate for the conventional molding or forming equipment that is desirably used.

The ionomeric nanocomposite of this invention is particularly useful for forming packages that have increased gas barrier properties compared to various conventional polyolefinic materials. Containers made from these polymer composite materials are ideally suited for protecting consumable products, such as foodstuffs, soft drinks or other beverages, cosmetics, pharmaceuticals, and the like. In another embodiment of this invention, the ionomeric nanocomposite and the molded article or extruded sheet may be concurrently formed by co-injection molding or co-extruding.

The compositions of the present invention allow the manufacture of articles, especially articles formed as sheet or film, that exhibit a combination of (1) gloss, (2) scratch resistance, (3) clarity, (4) gas or liquid barrier properties, and (5) thermal stability.

The gloss of a surface is defined as the angular selectivity of reflectance, involving surface-reflected light, responsible for the degree to which reflected highlights or images of objects may be seen as superimposed on a surface. The material of this invention preferably exhibits a 60° gloss of at least about 60 when measured in accordance with ASTM D-2457-97. Particularly preferred materials of this invention exhibit a 60° C. gloss of at least about 75 when measured by this technique.

Heat deflection temperature is another desired property in commercial articles, as it is a measure of the thermal stability above which a material will start to lose its structural integrity and therefore its desirable structural properties. Heat deflection temperature is measured under a flexural load of 0.455 MPa, according to ASTM D-648-01. Ionomeric nanocomposites of the present invention advantageously obtain a heat deflection temperature of at least about 102° C., preferably greater than about 104° C.

Flexural modulus of ionomeric nanocomposites of the invention, as measured under the ASTM standard defined in the Examples, is typically increased compared to conventional propylene ionomers that do not include nanomaterials properly dispersed therein and compared to conventional propylene polymers with nanomaterials that are not sufficiently neutralized. Thus, ionomeric nanocomposites of the invention preferably have a flexural modulus of at least about 2900, preferably at least about 3000. In one preferred embodiment, the flex modulus of ionomeric nanocomposites is at least about 3100.

Scratch resistance is an indication of the hardness of the surface of an article when measured in accordance with the Ford Laboratory Test Method BN 108-13. The testing device includes a pneumatically driven sledge with five metal fingers (250 mm long). One end of each metal finger is fixed while the other end is supplied with an interchangeable scratch pin with a stainless steel tip (1.0 mm in diameter). The pins are loaded with different weights to exert standard forces on the surface of the test material. The loads are increased, as allowed in the Ford Laboratory Test Method, in order to meet the required scratch forces on the surface of the samples. The loading forces are reported in Newtons (N). The compositions of the present invention exhibits a scratch resistance under a load of 15 Newtons of 4.0 or less, preferably 3.5 or less, and more preferably 3.0 or less and under a load of 10 Newtons of 3.5 or less, preferably 3.0 or less, and more preferably 2.5 or less.

Clarity may be defined as a low haze number, measured in accordance with ASTM D-1003-00, where haze is the cloudy or turbid aspect or appearance of an otherwise transparent specimen caused by light scattered from within the specimen or from its surface. Haze is determined as the percentage of transmitted light which, in passing through the specimen, deviates from the incident beam through forward scatter more than 2.5 deg on the average. The compositions of the present invention preferably exhibit a haze of less than about 50%, preferably less than about 40%, and more preferably less than about 30%.

Clarity may also be determined by the opacity of the material. Opacity describes the amount of light scattering and is a function of particle size, with larger particle size having greater opacity. Opacity is the ratio of the Y tri-stimulus for the sample measured over a black substrate divided by the Y tri-stimulus for the sample measured over a white substrate, expressed as a percentage. Tri-stimulus values are numbers that represent how the human visual system responds to a given color. An opacity of 100% indicates that the sample is totally opaque (i.e., the Y value is the same no matter what the substrate is). In theory, a perfectly clear sample has an opacity value of 0%; however, the lowest practical value is about 1%. The compositions of the present invention typically exhibit an opacity of less than about 40%, preferably less than about 30%.

Low haze, or high transparency, provides depth of color and gloss in pigmented compositions, as well as metallic and pearlescent brightness and clarity in special effects colors. Automotive articles, for example, that are formed from the colored compositions of the invention are similar to the adjacent painted surfaces of a vehicle, or can replace exterior painted surfaces, even for the highly desirable metallic colors.

Articles prepared according to the invention and used to store or otherwise contain other materials, such as food and beverage products, cosmetics, pharmaceuticals, or other consumable products, provide increased shelf-storage life for the contents thereof that are sensitive to the permeation of gases. Articles, more preferably containers, bottles, or packaging, formed from ionomeric nanocomposites of the present invention often display a gas transmission or permeability rate (oxygen, carbon dioxide, water vapor) of at least about 10% lower than that of similar containers made from compositions free of the ionomeric nanocomposites of the invention, resulting in correspondingly longer product shelf life provided by the container.

Articles prepared according to the invention may also be multilayered. Preferably, the multilayered articles have a nanocomposite material of the invention disposed intermediate to at least one other layer on either side thereof, although the nanocomposite may also be used to form one layer of a two-layered article. In embodiments where the ionomeric nanocomposite and its optional components are approved for food, cosmetic, or pharmaceutical contact, the nanocomposite may form the food, cosmetic, or pharmaceutical-contacting layer of the desired articles. In other embodiments, it is preferred that the ionomeric nanocomposite be in a layer other than the contact layer that contacts the materials stored or contained therein.

In one embodiment, molded articles may be manufactured by a process which comprises the step of forming a laminate skin including a surface layer and any intermediate layers, a step of disposing the skin in an injection mold in such a manner that the surface layer of the skin is in contact with the injection mold, and a step of forming a base layer which is integrated with the skin by injecting and filling a molten resin base composition into the injection mold in such a manner that the base layer is laminated on the intermediate layer of the skin. The surface layer may be transparent or may be colored by a coloring pigment. The base layer of the present invention may be made from a thermoplastic polyolefin composition with an excellent stiffness/impact balance.

In one embodiment, a co-extruded sheet article may be manufactured with a core layer and a skin layer. The core layer is typically formed of a polypropylene composite material. The skin layer is formed of a mixture of at least one ionomeric nanocomposite of the invention, along with any optional polymeric components and property modifying agents. The ionomeric nanocomposite provides the co-extruded sheet article with high gloss and scratch resistance, comparable to a conventional coated product. Additional layers may be incorporated into the composite structure, if desired.

If desired, the co-extrusion method disclosed in U.S. Pat. No. 5,972,520 is suitable for use with the ionomeric nanocomposites of the invention and is expressly incorporated herein by reference thereto. Other co-extrusion techniques can be used such as multiple extrusion heads, or with a multiple manifold flow divider and a single die head. The first and second layers are co-extruded with one another and formed of compatible materials so as to form a bond between the first and second layers without the use of an adhesive. As a result, the present invention does not necessarily require the formation of separate sheets (through extrusion or otherwise) and the separate bonding of the sheets as is commonly used in lamination.

Other manufacturing techniques for applying a coating or film to a substrate are generally known to those of ordinary skill in the art and may be used with the invention, including vacuum forming the coating over a premolded metallic or polymeric body panel or, in an alternative embodiment, placing the coating within a mold and injecting a polymeric substrate behind it.

A molded part may be made by thermoforming the co-extruded sheet or film of this invention. Thermoforming is the process of heating a plastic material in sheet form to its particular processing temperature and forming the hot and flexible material against the contours of a mold by mechanical or pneumatic means. When held to the shape of the mold and allowed to cool, the plastic retains the shape and detail of the mold. The process of thermoforming is well known to those skilled in the art and is described in detail in Throne, "Thermoforming" (ISBN 0-02-947610-0) Hanser Publications, New York (1987).

The thermoforming process may involve (1) heating the sheet in a separate oven and then transferring the hot sheet to a forming press; (2) using automatic machinery to combine heating and forming in a single unit; or (3) a continuous operation feeding off a roll of thermoplastic material or directly from the exit of an extruder die (post-forming).

The ionomeric nanocomposite materials of the invention can be used for making any type of article, but they are particularly suited for the manufacture of large structural parts, for example co-extruded profiles; household appliance cabinets, door liners, and counter tops; electrical equipment housings; engine covers and body panels for jet skis and snowmobiles; boat hulls and boat decks as well as boat engine covers, consoles, and hatches; indoor and outdoor hot tubs; pickup truck caps and camper tops; automobile body panels; body parts and engine shrouds for golf carts, all-terrain vehicles, lawn mowers, and lawn tractors; and agricultural equipment. The nanomaterials of the present invention may further be utilized in such applications as extruded sheet products, airbags, instrument panels, thermoformed materials, film, bottles, containers, and the like, or any portion thereof.

It should be understood that all weights referred to herein, unless otherwise noted, are per 100 parts by weight of the propylene-based polyolefin-metal salt component and the nanostructured material component.

The term "about," as used herein, should generally be understood to refer to both numbers in a range of numerals. Moreover, all numerical ranges herein should be understood to include each whole integer within the range.

EXAMPLES

The invention is further defined by reference to the following examples, describing the preparation of some of the ionomeric nanocomposites of the present invention. The following examples are offered by way of illustration, and not by way of limitation, to describe in greater detail certain suitable methods for the preparation, treatment, and testing of some ionomeric nanocomposites of the invention.

The significance of the symbols used in these examples, the units expressing the variables mentioned, and the methods of measuring these variables, are explained below. The test specimens were prepared by injection molding using a Van Dorn 120HT Injection Molding Machine at a melt temperature of 200° C. and a mold cavity temperature of 18° C.

| MFR [dg/min] | Melt Flow Rate, measured in dg/min at 230° C., under a load of 2.16 kg, according to ASTM D-1238-01 |
|---|---|
| Flex modulus [MPa] | Flexural Modulus, measured as mega-Pascals at 23° C. and a test speed of 13 mm/min and a rectangular test specimen of dimensions 12.7 mm × 127 mm, according to ASTM D-790-00 |
| Tensile Strength [MPa] | Tensile strength, measured as mega-Pascals at 23° C., according to ASTM D-638-01 |
| HDT, [° C.] | Heat deflection temperature, deflection temperature under a flexural load of 0.455 MPa, according to ASTM D-648-01 |
| Opacity, [%] | Ratio expressed as a percentage of the integrated reflectance from 400 nm to 700 nm of a sample over a black background to the same sample over a white background |

Materials Used in the Examples:

| PPMA-1, wt% | Polypropylene functionalized with maleic anhydride (MA) with MFR = 50 dg/min; MA content is 0.5 wt% |
|---|---|
| PPMA-2, wt% | Polypropylene functionalized with maleic anhydride (MA) with MFR = 190 dg/min; MA content is 1.0 wt% |
| Nanoclay, wt% | Closite 15A |
| Metal ion, pph | Metal ion component such as zinc acetate |
| Irganox B225 | Antioxidant |

Examples 1–2 and Comparative Examples 1–4

Examples 1–2 were prepared using two different maleic-anhydride functionalized polypropylene materials, each of which was neutralized with a metal salt and blended with a nanostructured material according to the invention. Comparative Examples 1–2 were prepared using the same polypropylene materials but without neutralization and without being blended with a nanostructured material. Comparative Examples 3–4 were prepared using the same polypropylene materials, each of which was neutralized with a metal salt, but without being blended with a nanostructured material. Comparative Examples 5–6 were prepared with the same non-neutralized polypropylene materials used in Comparative Examples 1–2 as well as a nanostructured material.

TABLE 1

|  | Ex. 1 | Ex. 2 | Comp. Ex. 1 | Comp. Ex. 2 | Comp. Ex. 3 | Comp. Ex. 4 | Comp. Ex. 5 | Comp. Ex. 6 |
|---|---|---|---|---|---|---|---|---|
| PPMA-1, pph | 90 | — | 100 | — | 100 | — | 90 | — |
| PPMA-2, pph | — | 90 | — | 100 | — | 100 | — | 90 |
| Nanoclay, pph | 10 | 10 | — | — | — | — | 10 | 10 |
| Metal ion, pph | 2 | 2 | — | — | 2 | 2 | — | — |
| MFR, [dg/min] | 4.6 | 6.1 | 50.1 | >500 | 13.7 | 28.9 | 9.7 | 73 |
| Flex modulus, [MPa] | 3182 | 3278 | 1649 | 1670 | 1980.7 | 1987.6 | 2767 | 2450 |
| Tensile strength, [MPa] | 49.6 | 46.8 | 36.9 | 36.7 | 42.9 | 43.8 | 44.7 | 33.2 |
| HDT, [° C.] | 111.8 | 111.2 | 91.3 | 92.5 | 100.6 | 101.8 | 97.9 | 92.6 |
| Opacity, [%] | 24.2 | 22.2 | 24.1 | 25 | 25 | 20.2 | 47.8 | 42.9 |

Comparative Examples 3–4 are conventional polymer/clay nanocomposites, which as clearly demonstrated have low thermal stability (i.e., HDT) and high opacity. Examples 1–2 show the surprising and unexpected results that occur when the propylene-based polyolefin metal salt is blended with the nanostructured material according to the invention. Without being bound by theory, it is believed that the significant decrease in opacity in ionomeric nanocomposites of the invention illustrates that the neutralization of the functionalized propylene resin is accompanied by the increased exfoliation of the nanoclay and, hence, the surprising and unexpected increase in the clarity of compositions of the invention. The increase in thermal stability is an indicator of the surprising and unexpected increase in the dispersion of the nanostructured material throughout the polymer matrix. Additionally, the ionomeric nanocomposites of the invention surprisingly and unexpectedly provided increased flex modulus compared to Comparative Examples 1–6.

Although preferred embodiments of the invention have been described in the foregoing description, it will be understood that the invention is not limited to the specific embodiments disclosed herein but is capable of numerous modifications by one of ordinary skill in the art. It will be understood that the materials used and the chemical details may be slightly different or modified from the descriptions herein without departing from the methods and compositions disclosed and taught by the present invention.

What is claimed is:

1. An ionomeric nanocomposite comprising:
   a nanostructured material; and
   a propylene-based polyolefin-metal salt component that is a reaction product of at least one propylene-containing homopolymer or copolymer and at least one organic monomer containing at least one hydrophilic moiety, the reaction product being sufficiently neutralized with a metal ion component to decrease the opacity of the ionomeric nanocomposite.

2. The nanocomposite of claim 1, wherein from about 0.0001 to 200 parts by weight of nanostructured material is present in the nanocomposite per 100 parts by weight of the propylene-based polyolefin-metal salt component.

3. The nanocomposite of claim 1, wherein the metal ion component comprises lithium, sodium, potassium, magnesium, calcium, barium, lead, tin, zinc, aluminum, or a combination thereof.

4. The nanocomposite of claim 1, wherein each hydrophilic moiety comprises an ethylenically unsaturated carboxylic acid monomer.

5. The nanocomposite of claim 4, wherein the ethylenically unsaturated carboxylic acid monomer comprises methacrylic acid, acrylic acid, itaconic acid, maleic anhydride, or mixtures thereof.

6. The nanocomposite of claim 1, wherein each of the nanostructured materials comprises one or more aluminosilicates, carbonaceous materials, layered double hydroxides, or mixtures thereof.

7. The nanocomposite of claim 6, wherein the aluminosilicates comprise polysilicates, phyllosilicates, tectosilicates, tetrasilicates, zeolites, or mixtures thereof; the carbonaceous materials comprise carbon nanoparticles, diamondoids, porous carbons, graphites, microporous hollow carbon fibers, single-walled carbon nanotubes, multi-walled carbon nanotubes, fullerenes, or mixtures thereof; and the layered double hydroxides comprise hydrotalcite, hydrotalcite-like materials, or mixtures thereof.

8. The nanocomposite of claim 1, further comprising a polymeric component present in an amount of about 1 to 300 parts by weight per 100 parts by weight of the propylene-based polyolefin-metal salt component and the nanostructured material component and comprising functionalized or non-functionalized propylene polymers, functionalized or non-functionalized ethylene polymers, functionalized or non-functionalized styrenic block copolymers, hydrogenated styrene butadiene random copolymers, ethylene ionomers, styrenic block ionomers, polyurethanes, polyesters, polycarbonates, polystyrene, or mixtures thereof.

9. The nanocomposite of claim 1, further comprising one or more a property modifying agents present in an amount of about 0.001 to 100 parts by weight per 100 parts by weight of the propylene-based polyolefin-metal salt component and the nanostructured material component and comprising one or more of thermal stabilizers, plasticizers, mold release agents, processing aids, nucleating agents, clarifying agents, antioxidants, ultraviolet light stabilizers, hindered amine light stabilizers, color concentrates, special effect pigments, mineral fillers, or combinations thereof.

10. The nanocomposite of claim 1, wherein the nanomaterial comprises at least one phyllosilicate.

11. The nanocomposite of claim 1, wherein the ionomeric nanocomposite has an opacity of less than about 40%.

12. An extruded article comprising the nanocomposite of claim 1, wherein the propylene-based polyolefin-metal salt component is present in an amount sufficient to increase the clarity of the extruded article compared to an extruded article that is free of propylene-based polyolefin-metal salt component.

13. A thermoformed article comprising the nanocomposite of claim 1, wherein the propylene-based polyolefin-metal salt component is present in an amount sufficient to increase the clarity of the thermoformed article compared to a thermoformed article that is free of propylene-based polyolefin-metal salt component.

14. A molded article comprising the nanocomposite of claim 1, wherein the propylene-based polyolefin-metal salt component is present in an amount sufficient to increase the clarity of the molded article compared to a molded article that is free of propylene-based polyolefin-metal salt component.

15. An article comprising the nanocomposite of claim 1 formed as a coating or a coextruded, multi-layer film or sheet.

16. The article of claim 15, wherein the coextruded, multi-layer film or coating forms at least an outermost layer of the article.

17. A container formed from the ionomeric nanocomposite of claim 1.

18. The container of claim 17, further comprising a gas-sensitive consumable product within the container.

19. A method of preparing an ionomeric nanocomposite which comprises:

providing 100 parts by weight of a propylene-based polyolefin-metal salt component, from about 0.0001 to 200 parts by weight of nanostructured material, optionally a polymeric component, and optionally a property-modifying agent;

melt blending the components sufficiently to provide a blend that is at least substantially homogeneous.

20. The method of claim 19, further comprising thermoforming, molding, or extruding the at least substantially homogeneous blend so as to form an article.

* * * * *